May 21, 1935.   J. M. BONBRIGHT   2,001,763
MEANS FOR VENTILATING THE INTERIOR OF AUTOMOBILE BODIES
Filed Nov. 27, 1933

INVENTOR
JOHN M. BONBRIGHT.
BY
ATTORNEY

Patented May 21, 1935

2,001,763

UNITED STATES PATENT OFFICE 2,001,763

MEANS FOR VENTILATING THE INTERIOR OF AUTOMOBILE BODIES

John M. Bonbright, Detroit, Mich.

Application November 27, 1933, Serial No. 699,853

2 Claims. (Cl. 296—44)

This invention relates to ventilating means for the interior of automobile bodies, the object being to provide, either in a door or in a fixed part of the body and preferably in the forward windows of the body, a ventilating window structure which involves the provision of a transparent shield supported at its upper edge in the upper cross rail of the frame forming the window opening and extending a few inches therebelow, said shield extending from the rear vertical side of the window frame and terminating short of the forward vertical side of the window frame whereby, in lowering the window glass proper to a distance less than the least vertical height of the transparent shield, an opening is provided at the forward end of the window between the top edge of the glass and top rail and the forward edge of the shield and thus, upon lowering of the window to such extent, a small opening is provided at the forward part of the window. In conjunction with such arrangement and on the exterior of the window frame is mounted a pivoted wind wing of transparent material adapted to be turned at an angle to the longitudinal axis of the car to extend into the wind stream of the moving car, the width of the wind wing along a horizontal line being such that the air stream passing about the rear edge of the wing produces an area of reduced pressure between the said edge and the forward edge of the transparent element thereby causing air flow passing from the rear of the vehicle body toward the forward end and out through the said opening.

It is a feature and object of the invention to provide a construction which may be used in the commercial production of cars embodying the invention and also a detachable transparent member and wind wing that may be applied to the usual car unprovided with a ventilating means other than by the mere lowering of the window glass.

The object to be attained therefore is to provide a simple and inexpensive structure that may be built in or attached to a vehicle with the transparent shield and wind wing on the exterior of the window in the relationship described and thereby preventing rain or snow from passing into the vehicle when the window is lowered as well as providing for ventilation.

These and other objects and general features of the invention as well as more specific features are hereinafter more fully described and claimed, and a structure embodying my invention in its preferred form is shown in the accompanying drawing in which:—

Figure 1:
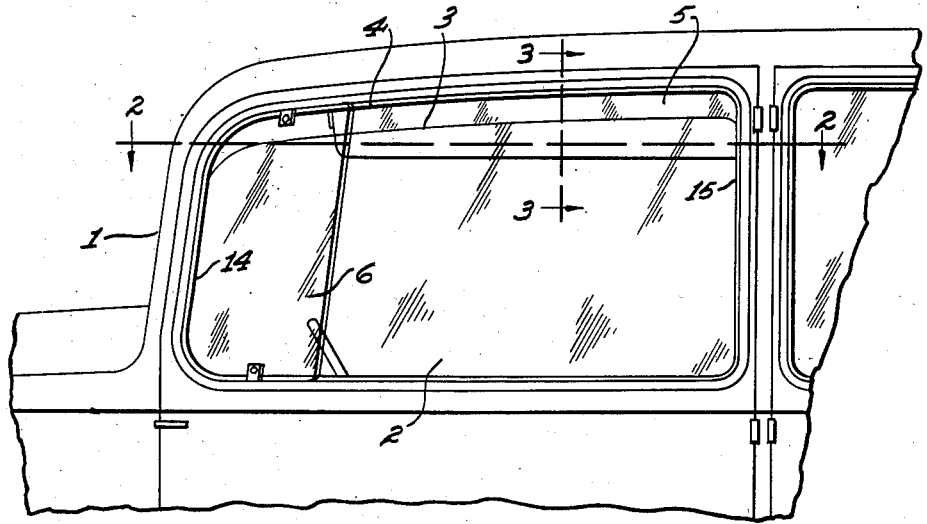
Fig. 1 is an elevation of a portion of an automobile body showing a window constructed in accordance with my invention.

In Fig. 1 I have shown the upper and forward portion of an automobile body indicated at 1 having an opening therein closable by the vertically movable glass 2, the upper edge 3 of which, as is the usual practice, conforming in outline to the form of the lower face 4 of the upper cross frame of the window opening which is of the usual construction. Heretofore, with such usual construction the lowering of the window glass permits snow and rain and wind to enter causing discomfort and excessive drafts within the interior of the body and in stormy weather prevents proper ventilation of the interior of the body as in such usual construction, it is practically necessary to keep the window closed. To avoid these objectionable features of ventilation through the mere lowering of the window, I have provided as an adjunct thereto a means for causing air from the interior to pass out from the vehicle preferably above the forward edge of the glass. To secure the desired result inexpensively, I have provided a transparent shield 5, the lower edge of which is here shown as a horizontal line but may be curved to correspond with the curve of the upper edge 3 of the glass member 2 which is to be understood as being arranged in conjunction with a window regulator (not shown) for raising or lowering the same. The bottom edge 5 of the transparent shield, depending upon its width, is spaced three or four inches or other desired distance from the upper edge 4 of the window opening and extends from the rear vertical side 15 of the window opening and terminates a distance short of the forward practically vertical side of the window frame 14 leaving an opening defined by the forward edge of the transparent shield and the forward edge of the window opening and between the upper edge 4 of the window opening and the upper edge 3 of the lowered sash at this forward end.

Figure 2:
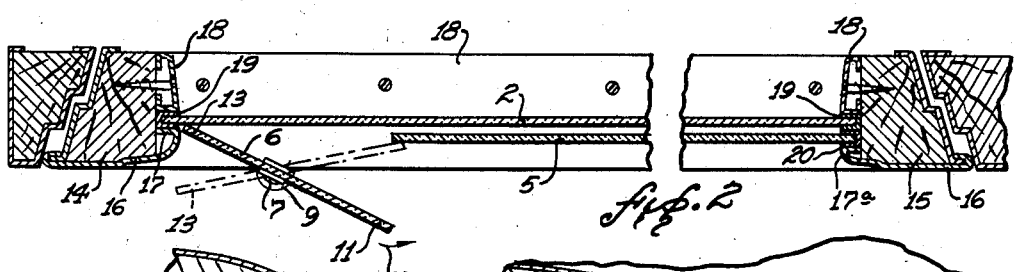
Fig. 2 is a section on an enlarged scale taken on line 2—2 of Fig. 1.

To induce currents of air from the vehicle body to flow outwardly thereof I provide a wind wing 6 pivoted to swing on a vertical axis, it being provided with a pivot pin 7 at the lower horizontal edge and a similar pin thereabove, each of which is seated in a part provided therefor at the upper and lower edges of the window frame such, for instance, as the bracket 9 shown more clearly in Fig. 2. The transparent shield 5 and the wind wing 6 are on the outer side of the window 2 as will be understood from Fig. 2 and the wind wing may be positioned at the angle shown in full lines in Fig. 2 so that the outer edge 11 thereof and for a distance toward the front of the car lies in the wind stream which, due to movement of the vehicle, strikes this wind wing and is deflected outwardly and thence around the said rear edge in the direction of the arrow 12. This air flow along in the general direction of the arrow 12 causes an area of reduced pressure between the rear edge 11 of the wind wing and the forward end of the transparent shield 5 which induces flow of air from the interior of the body and outwardly into the wind stream as is suggested by the arrows.

The wind wing 6 being pivotally mounted after the manner shown permits the same to be turned outwardly as indicated in the full lines or to be turned inwardly as indicated by the dotted lines under which condition the forward edge 13 of the wind wing projects into the air stream and causes a flow of air directly into the body of the vehicle under conditions in which such flow is desired.

The construction of the window opening, here shown as being in the door of a vehicle, is the usual construction having the vertical rails 14 and 15 at opposite edges, the metal finish panel 16 which extends into the window opening and has an inturned part 17 forming one side of the channel for the glass 2, the opposite side of the channel being provided by the usual removable finish strip 18 and in the channel between these two parts 17 and 18 is provided the usual channel 19 for the glass 2 which may be of metal, felt or other desirable construction.

Figures 3, 4, 5:
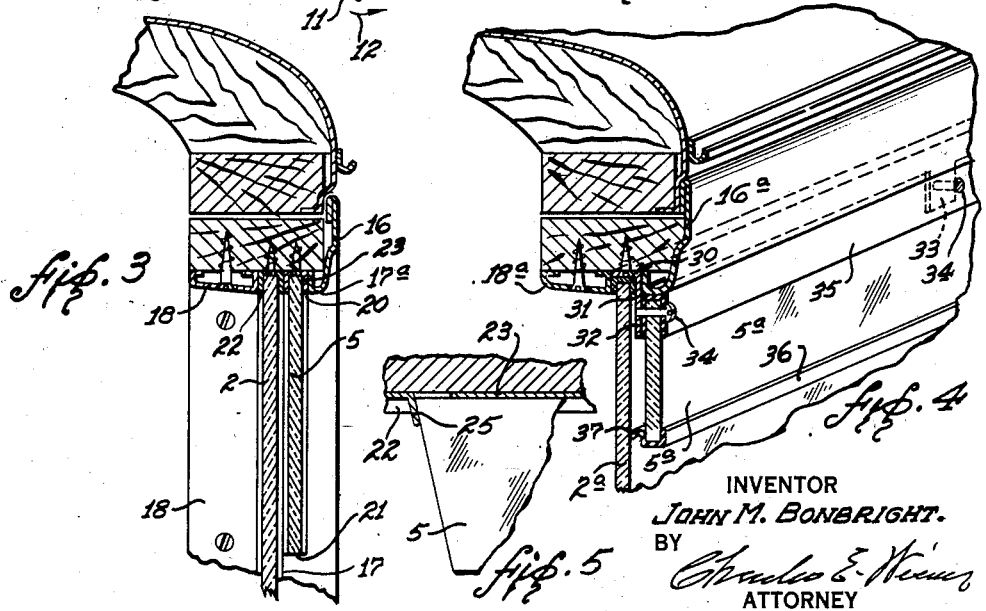
Fig. 3 is a section on an enlarged scale taken on line 3—3 of Fig. 1.
Fig. 4 is a sectional perspective showing my invention as devised for an attachment or accessory for automobile bodies.
Fig. 5 is a vertical section taken through the upper channel in which the transparent shield is seated.

The structure shown in Figs. 1, 2 and 3 is a form of construction that may be utilized in the general production of automobile bodies and in order that the transparent shield 5 may be properly supported in place, the rear vertical edge of the member 16 may be shaped as at 17a to provide a proper width of channel between the said portion 17a and the corresponding edge of the member 18. This permits the insertion of the rear and substantially vertical edge of the transparent shields in a channel element of the desired character indicated at 20 side by side with the channel 19 for the glass 2 and these channels in the construction shown properly space the shield 5 from the glass 2 to prevent any dust or dirt that may accumulate thereon from rubbing the polished surfaces of the two elements 2 and 5 in the raising or lowering of the glass 2.

It will also be noted that the shield 5 is positioned on the exterior of the glass 2 as is likewise the case with the wind wing and that the channel portion 17a extends into the window opening to a lesser extent than the portion 17 and provides a way for the rear edge of the transparent shield 5 and the lower edge of this way as at 21 provides a solid support therefor. The part 16 being thus constructed on the vertical rear side of the window opening and at the top thereof provides a practically double width of way within which the upper and rear edges of the transparent shield 5 and upper and rear edges of the glass 2 may seat, both of which respectively seat in channel strips 22 and 23 at the upper edge which channel strips may be of any approved form. Preferably, the upper longitudinal channel strip 22 for the shield 5 is of metal which may be fastened in place as by means of screws and at the forward end the channel member 22 has a downwardly struck portion 25 which, due to the shape of the forward end of the shield, holds the said forward end from dropping and also securely holds the rear edge thereof in the way provided by the form of the member 16. Any approved means however may be utilized in fixedly securing the transparent shield member 5 in place and it is also pointed out that the outline shape of the shield may be varied to conform to the lines of the structure with which it is associated.

An alternative form of the invention is shown in Fig. 4 in which the window opening is provided with the usual facing strip 18a on the interior of the window opening and the usual outer member 16a having an inturned end spaced from the inner edge of the member 18a providing a way for the vertically movable glass 2a. This structure of Fig. 4 is the form of the invention adapting it to be sold as an accessory for automobiles not provided with a ventilating means of the character described. The only difference between the form shown in Fig. 4 and the previous form is the manner of supporting the transparent shield 5a. For this purpose a thin strip of metal 30 is provided secured as by means of screws in the bottom of the channel between the opposed faces of the members 16a and 18a. This extends downwardly on the outer face of the glass member 2a in the shape of an inverted L in cross section as indicated at 31 and is provided with a series of lugs 32 and 33 and the screws 34 are provided passing through the glass and threaded into these lugs. The shield 5a at its upper edge is provided with a channel 35 of any approved material such as rubber for instance which is held in close engagement with the lower edge of the outer face portion 16a of the window opening. This member 35 thus seats against the lower edge of the portion 16a and prevents an ingress of air therebetween. The lower edge of the shield 5a is preferably provided with a rubber channel 36 the inner edge of which is provided with an extending lip 37 riding against the face of the glass 2a in its opening or closing movements.

Such a strip 36 may be used with either of the forms of construction disclosed herein or may be dispensed with as the function of the parts in providing for ventilation is not dependent upon such a strip or channel but is considered a desirable feature of construction in the prevention of an accumulation of rain, snow or other form of material in the space between the transparent shield and the glass and also prevents flow of air in the vehicle body between the shield and glass. The shield 5a in the construction disclosed in Fig. 4 is to be used in conjunction with the wind wing, being the same character and arrangement of such wind wing as indicated in Figs. 1 and 2, to secure the desired functional relationship of parts in providing for ventilation as described relative to the structure shown in said Figs. 1 and 2.

It is believed evident from the foregoing that my improved ventilating means for closed bodies of automobiles having movable window glass is of very simple nature requiring only the two main additional parts, namely, what I have termed the transparent and fixed shield member 5 or 5a and the wind wing 6 and the supporting elements for the respective members and that in association with a one-piece glass of standard character of construction provides an efficient and comparatively inexpensive structure embodying the features of the invention, it being understood that various changes may be made in the structure including the arrangement and construction of channels and co-related parts without departing from the spirit and scope of the invention as set forth in the appended claims.

Having thus briefly described my invention, what I claim and desire to secure by Letters Patent of the United States is—

1. A ventilating means for use in conjunction with closed automobile bodies having a window opening, comprising the combination with a pair of channel strips mounted in the window opening in side by side relation, a vertically movable glass member for closing the window opening and movable into or out of one channel strip and a transparent shield member secured in the other channel strip and extending below the upper edge of the window opening a comparatively short distance and further extending from the rear vertical side of the opening and terminating at a distance from the forward vertical side thereof, a lug struck downwardly from the channel strip for the transparent shield member, said lug engaging the forward edge of the transparent shield member and supporting the same in the respective channel strip, an angularly disposed wind wing at the forward side of the window opening exteriorly of the plane of movement of the vertically movable glass member and extending outwardly therefrom whereby on forward movement of the automobile and with the vertically movable glass member lowered to a position with the upper edge at or above the lower edge of the transparent shield, air is caused to flow from the interior of the body through the opening forward of the transparent shield.

2. A ventilating means for use in conjunction with closed automobile bodies having a window opening, comprising the combination with a pair of channel strips mounted in the window opening in side by side relation, a vertically movable glass member for closing the window opening and movable into or out of one channel strip and a transparent shield member secured in the other channel strip and extending below the upper edge of the window opening a comparatively short distance and further extending from the rear vertical side of the opening and terminating at a distance from the forward vertical side thereof, a lug struck downwardly from the channel strip for the transparent shield member, said lug engaging the forward edge of the transparent shield member and supporting the same in the respective channel strip.

JOHN M. BONBRIGHT.